(12) United States Patent
Barel

(10) Patent No.: US 11,020,892 B2
(45) Date of Patent: Jun. 1, 2021

(54) PROCESS FOR MAKING A BOTTLE OF A POLYMERIC MATERIAL

(71) Applicant: P.E.T. ENGINEERING S.R.L., San Vendemiano (IT)

(72) Inventor: Moreno Barel, Refrontolo (IT)

(73) Assignee: P.E.T. Engineering S.R.L., San Vendemiano (IT)

(*) Notice: Subject to any disclaimer, the term of this patent is extended or adjusted under 35 U.S.C. 154(b) by 247 days.

(21) Appl. No.: 16/099,526

(22) PCT Filed: May 12, 2017

(86) PCT No.: PCT/IB2017/052798
§ 371 (c)(1),
(2) Date: Nov. 7, 2018

(87) PCT Pub. No.: WO2017/199146
PCT Pub. Date: Nov. 23, 2017

(65) Prior Publication Data
US 2019/0143577 A1  May 16, 2019

(30) Foreign Application Priority Data
May 17, 2016 (IT) .................... 102016000050313

(51) Int. Cl.
*B29C 49/78* (2006.01)
*B29C 49/08* (2006.01)
*B29C 49/42* (2006.01)
*B29L 31/00* (2006.01)
*B29K 67/00* (2006.01)
*B29C 49/06* (2006.01)

(52) U.S. Cl.
CPC ............ *B29C 49/783* (2013.01); *B29C 49/08* (2013.01); *B29C 49/4205* (2013.01); *B29C 49/786* (2013.01); *B29C 49/06* (2013.01); *B29C 2049/4226* (2013.01); *B29C 2949/7889* (2013.01); *B29C 2949/78537* (2013.01); *B29C 2949/78605* (2013.01); *B29C 2949/78655* (2013.01); *B29C 2949/78663* (2013.01); *B29C 2949/78899* (2013.01); *B29K 2067/003* (2013.01); *B29L 2031/7158* (2013.01)

(58) Field of Classification Search
CPC ... B29C 49/783; B29C 49/08; B29C 49/4205; B29C 49/786
See application file for complete search history.

(56) References Cited

U.S. PATENT DOCUMENTS 5,462,180 A * 10/1995 Bright ..................... B29C 57/12
215/12.1
5,888,598 A * 3/1999 Brewster .............. B29C 49/0005
264/513
(Continued)

FOREIGN PATENT DOCUMENTS

EP        0612667 A2 * 8/1994 .......... B65D 23/001

*Primary Examiner* — Joseph S Del Sole
*Assistant Examiner* — Yung-Sheng M Tsui
(74) *Attorney, Agent, or Firm* — MacMillan, Sobanski & Todd, LLC

(57) ABSTRACT

A process for making a bottle of a polymeric material suitable for being used with carbonated drinks, comprising the steps of: positioning a preform in a mould; and blowing the preform. The process is characterized in that a total draw ratio greater than 16 is used.

7 Claims, 1 Drawing Sheet

(56) References Cited

U.S. PATENT DOCUMENTS

| | | | | |
|---|---|---|---|---|
| 5,939,153 A | * | 8/1999 | Valyi | B29C 49/0005 |
| | | | | 428/1.55 |
| 7,820,257 B2 | * | 10/2010 | Kjorlaug | B65D 1/0223 |
| | | | | 428/35.7 |
| 2016/0250795 A1 | * | 9/2016 | Knight | B29C 49/0073 |
| | | | | 215/44 |

* cited by examiner

PROCESS FOR MAKING A BOTTLE OF A POLYMERIC MATERIAL

FIELD OF THE INVENTION

The present invention relates to a process for making a bottle of a polymeric material.

In the remainder of the description, reference will mainly be made, for ease of description, to bottles made of a polymeric material, such as PET (polyethylene terephthalate), it being however understood that the principles of the present invention can also be applied to other types of polymeric material.

BACKGROUND ART

A bottle for beverages generally comprises a mouth, a neck, a shoulder, a body and a bottom.

Neck means the narrowest portion of the bottle. The cap intended to close the mouth of the bottle is usually screwed or fastened at the neck.

Body means the usually largest portion of the bottle, which may have substantially constant or variable, in other embodiments, cross section, such as circular or square in shape.

Shoulder means the flared portion of the bottle adapted to join the neck to the body.

Bottom means the portion at the opposite end with respect to the mouth, which has a support function for the bottle, ensuring that it maintains a vertical position when placed on a surface.

As is known, the bottom of bottles can be made substantially in two ways, making a spherical bottom and applying a separate base of polymeric material, or creating a particular geometry of the bottle bottom which allows to obtain a support surface for the bottle.

As for the bottles with separate base, the base can be made, for example, by injection molding of the thermoplastic materials, such as polycarbonate or ABS (acrylonitrile butadiene styrene) or the like. These bottles can be considered as composite bottles composed of a bottle element consisting of a neck, a shoulder, a bottle body and a bottom, and a separate base having the function of supporting the bottle element during use. The base is intended to be fixed to the bottom of the bottle, for example by bonding, snap fasteners, by screwing and similar known means.

Such a type of base comprises a central concave portion with concavity facing upwards, i.e. facing towards the adjacent bottom of the bottle, adapted to accommodate the bottom of the bottle, from which an edge extends peripherally downwards, intended to rest on the support surface and ensure that the bottle element is kept in vertical position, regardless of the bottom shape.

If the bottle is provided with a separate base, the bottom of the bottle may be made with any shape, in particular with semi-spherical or rounded shape, in order to increase the structural strength thereof without the need to arrange reinforcing ribs. Such a solution is for example described in EP0612667.

The solution with separate base was widely used in the past and is still used for containers which must contain a liquid at a high pressure. This bottle is normally characterized by rather large wall thicknesses and is therefore expensive to make, due to the larger amount of thermoplastic material which needs to be used.

In this type of bottles, the total draw ratios achieved are at most 15. It is noted that total draw ratio refers to the product between the axial draw ratio and the radial draw ratio represented by the following formulas:

$$R_{radial} = \frac{\phi_{bottle}}{\phi_{average-preform}}$$

$$R_{axial} = \frac{L_{bottle}}{L_{preform}}$$

$$R_{total} = R_{radial} \cdot R_{axial}$$

After the bottles with separate base, bottles were developed having a complex bottom surface, adapted to support a bottle. These bottles in fact have a lower cost both because they are lighter and because they require fewer steps for their production, the step of coupling with the separate base being eliminated.

A traditional solution is represented by the arrangement of ribs, also known as petals, at the bottom. A similar bottom is therefore referred to as a "petaloid bottom". Such ribs are generally arranged according to a radial direction. A solution of this type is for example described in U.S. Pat. No. 3,598,270.

Petals substantially consist in extroversion areas with respect to a hypothetical spherical geometry of the bottom, so as to obtain the support areas of the bottle.

While this solution is appreciated, it however exhibits some problems since the design of bottles with a petaloid bottom is complex and sometimes very long due to the many critical issues which must be taken into account by the designer, such as: gas content, final weight of the bottle, type of preform and resin to be used, production requirements, types of machines used, content type, storage type, temperature and climatic conditions, etc.

The formation of petals in fact implies that there are inevitably some areas of bottom bottle with an amorphous, non-drawn structure. These areas have lower mechanical strength and are characterized by less flexibility. Moreover, other areas of the bottom, in particular those coinciding with the maximum curvature points at the crests of the petals, may be subject to an over-drawing. These areas, which often are white in color, having lost their transparency, constitute points through which there may be an exchange of gases with the outside and where structural failures of the bottom may occur, thus impairing the stability of the bottle itself.

The bottles with petaloid bottom are therefore subjected, due to their nature, to a series of problems and drawbacks.

A first problem the designer has to take into account is the bursting strength. The maximum pressure beyond which the bottom may burst is regulated by many parameters, among which the geometry of the petaloid, the accumulation of amorphous material (i.e. not drawn, or not bi-oriented in jargon), the quality of the materials used for the preform, the intrinsic viscosity of the polymeric material used, the heating and blowing conditions.

This problem is very much felt by the producers of highly carbonated beverage: in fact, the higher the pressure inside the container, the more critical this problem is, especially in the production lines when filling the bottle. A bursting of a bottle may cause substantial production losses. In addition, the problem is much felt also in storage areas, where temperatures may be less controlled and may also reach high values.

A second problem, strongly felt by bottlers, is the "stress cracking" phenomenon. By "stress cracking" it is meant the formation of fissures or cracks due to both the pressure exerted by the liquid and gas contained in the bottle, and to the development of internal stresses, e.g. activated by thermal or mechanical stress. The accumulation of non-drawn amorphous material at the petals of the bottom increases the possibility that cracks and fissures may develop at the bases of the petals, resulting in product loss and damage to the surrounding packages.

This type of problem is for example mitigated by designing ad hoc preforms, or increasing the intrinsic viscosity of the polymer used. All with aggravated costs.

The same accumulation of non-drawn material, which is therefore less flexible, can also cause the breaking of the bottle after a fall.

Therefore, the amount of material which is used to make the bottom plays a fundamental role, as it is also the basis for complex process settings, which limit the production rate, for example by imposing a blowing with two different pressure values and also using a drawing rod. This however limits the production rate.

The amount of material is also important for the stability of the bottle when it contains a carbonated beverage, especially at certain temperature values.

Also, if the petaloid is not designed properly and especially if it is not made with a suitable amount of material, the central part of the bottom may become deformed outwards, thereby creating instability of the bottle in the production lines.

In addition, should the bottom become deformed on the display and sales rack, the bottle could be in unstable condition with obvious consequences at the retail sale level.

In bottles containing a carbonated liquid, a further aspect to be considered is the loss of carbon dioxide to which the bottle can be subjected. Generally, bottles with uniform thicknesses are tried, but at the points of greater bi-orientation, so where the thicknesses become thinner, such as the petal crest, there may be areas where the material is overdrawn, so the thicknesses are minimal and the loss of carbon dioxide can occur.

Due to process and geometrical limits of both the preforms and the petaloid bottoms, the crests of the petals may have a thickness of 30-40% thinner than the rest of the bottle. These points represent potential leak points for the escape of carbon dioxide.

In blowing machines, a more stringent cooling is required to cool the petaloid bottoms, with streams of water at the outlet of the machine. Since increasingly shorter cycle times are required, the cooling of bottle bottoms with petaloid becomes an even more critical process step.

SUMMARY OF THE INVENTION

Therefore, it is the object of the present invention to solve the drawbacks of the above prior art.

It is a first task of the present invention to provide a bottle which is not affected by the problems of the bottles with petaloid bottom, in particular which is less prone to stress cracking, bursting and extroversion with respect to the prior art bottles.

Moreover, it is a task of the present invention to provide a process for making a bottle of a polymeric material which is more cost-effective than the process of the prior art, while allowing to simplify significantly the process which is currently suffering from multiple complications, including the arrangement of a remarkably complex pressurized air circuit, given the pressures involved.

Such an object is achieved by a process for making a bottle of a polymeric material as outlined in claim 1, the definitions of which form an integral part of the present description. Preferred aspects of the invention are outlined in the dependent claims.

Further features and advantages of the present invention will become more apparent from the description of some preferred embodiments thereof, made hereinafter by way of a non-limiting example only with reference to the attached drawings

DETAILED DESCRIPTION OF THE INVENTION

Figure 1:
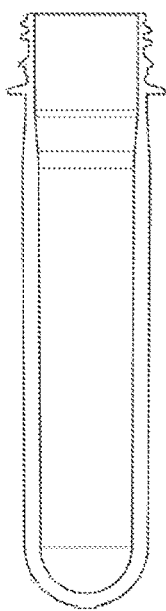
FIG. 1 shows a lateral sectional view of a typical thermoplastic preform usable for blowing bottles.

In particular, a process has been devised for making a bottle of a polymeric material suitable for being used with carbonated drinks, comprising the steps of:
a) positioning a preform in a mold;
b) blowing of the preform to form a bottle with a non-petaloid bottom convex towards the outside,
characterized in that in step b) a total draw ratio greater than 15 is applied.

The advantages and the features of the present invention will appear clearly from the following detailed description of some embodiment examples, made by way of non-limiting explanation.

The process for making a bottle of a polymeric material suitable for being used with carbonated drinks, according to the present invention, therefore comprises the steps of:
a) positioning a preform in a mold; and
b) blowing of the preform to form a bottle with a non-petaloid bottom convex towards the outside.

Step (b) is carried out by means of a blowing gas. In certain embodiments, the blowing gas has a pressure not greater than 15 bar, or lower than 10 bar. In other embodiments, if logos or parts of the bottle with different embossments or debossments are required, the blowing pressure can be increased.

The process is characterized in that a total draw ratio greater than 15, preferably greater than 16 is used.

More preferably, the total draw ratio is from 16 to 23.

Moreover, it has been seen that it is particularly advantageous to use an axial draw ratio from 3.5 to 4.5 with a radial draw ratio from 4 to 5.5.

According to a possible embodiment, the intrinsic viscosity can be from 0.78 to 0.84 Dl/g, preferably about 0.8 Ng.

The intrinsic viscosity is determined according to the ASTM D4603 and ISO 1628-5 standards. This determination is carried out with a capillary viscometer, e.g. Ubbelohde Type 1B, and provides for the dissolution of the polymer in a suitable solvent (60% phenol/40% tetrachloroethane) at a concentration of about 0.5 g/Dl and at a constant temperature of about 30.0±0.1° C., until the thermal equilibrium is achieved. The solution is passed in the capillary viscometer and the flow time is recorded.

The temperature of the preform prepared for blowing may be from 90° C. to 115° C.

In a possible embodiment of the present invention, the mold may be preheated.

In one embodiment of the present invention, the mold used in the process of the present invention is adapted to obtain a bottle with a bottom consisting of a substantially hemispherical surface.

With the process features just described, a blowing pressure from 2 to 15 bar and preferably lower than 10 bar may be used.

In order to obtain a bottle with a bottom convex towards the outside, in particular a bottle with a hemispheric bottom, it is also important to use a preform with predefined features specially designed for this purpose.

In particular, the ratio of the thickness of the preform to that of the bottom of the bottle which will be obtained therefrom, in the sprue area, is from 8 to 14. It will be useful to note herein that, for traditional bottles, this ratio is from 1.5 to 3.

By applying a total draw ratio greater than 15, preferably than 16, to a preform so designed, a bottle can be obtained which has the required tensile strength of the bottom, reduced stress cracking, higher bursting strength in case of overpressure and so on.

Figure 2:
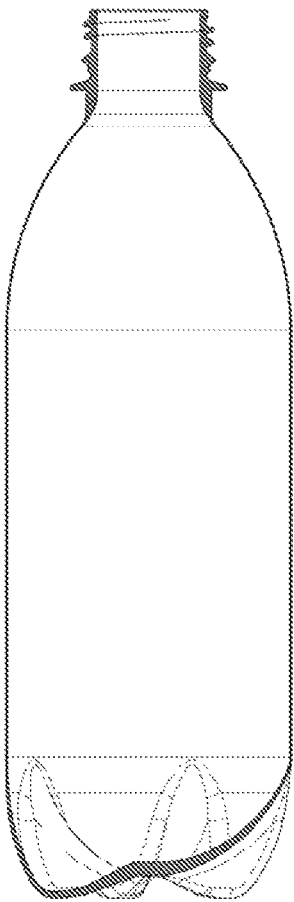
FIG. 2 shows a lateral sectional view of a traditional bottle with petaloid bottom obtainable from the preform in FIG. 1.
Figure 3:
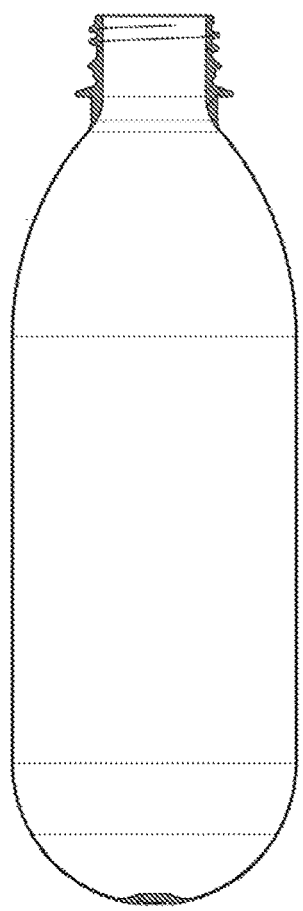
FIG. 3 shows a lateral sectional view of a bottle with convex bottom obtainable from the preform in FIG. 1 by the process of the invention.

The bottle obtained with this process has a high uniformity of thicknesses of the bottom, as shown in FIG. 3, where a slight thickening is visible only at the area of the sprue. In contrast, the traditional bottle with petaloid bottom, shown in FIG. 2, obtained starting from a same preform (FIG. 1) has a remarkable variability of thickness, which results in the disadvantageous properties listed above.

In particular, the convex bottom of the bottle according to the invention will be preferably characterized by average thicknesses from 0.1 to 0.4 mm, while in a bottle with hemispheric bottom of the traditional type, with the same weight of 18 g, the thickness of the bottom normally ranges from 0.18 to 2.5 mm.

The high homogeneity of thicknesses in the bottom area allows the bottle according to the invention to maximize the mechanical features, avoiding over-draw areas or accumulation of material. Also gas impermeability is improved, due to the absence of over-drawn areas.

A further feature of the bottle of the invention which testifies to the high homogeneity of thicknesses obtainable with the process described above is the ratio of the average thickness of the bottle bottom to the average thickness of the bottle body. This parameter ($R_{bottom/body}$) is preferably from 0.5 to 2. Conversely, in a traditional bottle with a hemispheric bottom, such $R_{bottom/body}$ is from 7 to 12.

This advantageous feature of the bottle according to the present invention allows to reduce the material used, thus the cost of the bottle, whilst improving its mechanical and physical performance.

The bottle according to the invention is further characterized by a greater bursting strength than traditional bottles of equal weight. The greater the drawing, the better the mechanical properties of the bi-oriented PET film and therefore the greater the bursting strength.

With the draw ratios shown above, very high bi-orientation values can be obtained throughout the resulting bottle. High bi-orientation values allow to obtain high mechanical features, while maintaining the ability to retain carbon dioxide inside the bottle. This is because the greater levels of bi-orientation allow to reduce the expansion of the bottle under pressure and allow to increase the crystallinity values of the bi-oriented film and thus the barrier to $CO_2$.

If a bottle with traditional petaloid base were produced with total draw ratio values from 17 to 23 using polymers with intrinsic viscosity from 0.78 to 0.84 Dl/g, a bottle with extremely uneven thicknesses and difficulty to form the bottom would be obtained.

In bottles with traditional bottom, be it spherical or petaloid, total draw ratios from 8 to 14 are in fact obtained, with the same weight of the preform and intrinsic viscosity.

The process of the present invention allows a simpler design of the preform and the container, since the complexities of the petaloid bottoms are eliminated.

In addition, a reduced complexity of the process is ensured, eliminating the structural complexity due for example to the use of high pressures.

Although bottles with a round bottom were made in the past, they were not made with a total draw ratio like that of the present invention, since there was no need to reduce the weights of the material used for the preform.

The bottles obtained according to the present invention have also shown a remarkable thermal stability. In particular, in a thermal stability test (24 hours at 38° C. with 4.2 GV) on samples of the bottle of the invention, the following values were obtained:

Average height percent variation
    Average value 1%
    Minimum value 0.88%
    Maximum value 1.1%
Percentage variation of the average shoulder diameter
    Average value 2.63%
    Minimum value 2.45%
    Maximum value 2.85%.

It is noted that the normally accepted percentage variation of the dimensions is from 2.5% to 3.5%.

The advantages attainable using draw ratios like those shown above primarily relate to the mechanical features of the bottom which can be obtained, due to the maximum bi-orientation values which can be obtained at the bottom of the bottle.

Moreover, the bursting strength is maximized and it is therefore possible to use polymers with lower features in terms, for example, of intrinsic viscosity.

A further advantage with respect to the petaloid bottom is the elimination of the transition areas between drawn amorphous area and non-drawn amorphous area, and as a result of the areas where the phenomenon of stress cracking, breakage by bursting during the filling and/or storage step or extroversion of the bottom could occur.

In fact, in the gate area, i.e. in the central area of the bottom of the bottle, in bottles with petaloid, the thickness is reduced by about one third with respect to the thickness in the corresponding point of the preform, and sometimes the thickness of the bottle at that point is almost the same as that of the preform due to process limits of the plant or due to an unsuitable design of the preform or bottle, in particular of the bottom. In the bottle obtained with the present invention, the thickness is reduced at least seven times, but it is possible to reach even values of twenty, ensuring highly satisfactory mechanical features.

Moreover, an advantage is also obtained with respect to traditional bottles with round bottom, because using such high total draw ratios, the accumulation of material around the gate, i.e. around the central part of the bottom of the bottle is eliminated.

Although the bottle according to the invention requires the use of a base for keeping it in a vertical position, the additional cost of such a base is substantially low, a particular material and processing not being required, and it is greatly outweighed by the advantage of cost and performance obtained according to the invention.

Those skilled in the art may make several changes to the embodiments described above and/or replace the elements described with equivalents in order to meet specific needs, without departing from the scope of the appended claims.

The invention claimed is:

1. A process for making a bottle, comprising the steps of:
    a) positioning a preform comprised of a thermoplastic polymeric material capable of withstanding pressures of carbonated drinks in a mould having a non-petaloid bottom convex towards an outside of the mould;
    b) blowing of the preform to form a bottle with a non-petaloid bottom convex towards the outside of the bottle,
    wherein, in step b) a total draw ratio greater than 15 is applied to the preform, where the total draw ratio is a product of an axial draw ratio and a radial draw ratio; and
    wherein the axial draw ratio ranges from about 3.5 to about 4.5, and the radial draw ratio ranges from about 4 to about 5.5 and,
    wherein the ratio between the thickness of the preform and that of the non-petaloid bottom of the bottle which will be obtained therefrom, in the sprue area, is between 8 and 14.

2. The process according to claim 1, wherein the total draw ratio ranges from about 16 to about 23.

3. The process according to claim 1, wherein the intrinsic viscosity of the thermoplastic polymeric material ranges from 0.78 to about 0.84 dL/g.

4. The process according to claim 1, wherein the temperature of the preform provided for the blowing ranges from 90° C. to about 115° C.

5. The process according to claim 1, wherein the blowing pressure ranges from 2 to about 15 bar.

6. The process according to claim 5, wherein the blowing pressure between 2 and less than 10 bar.

7. The process according to claim 1, wherein the obtained bottle has a bottom consisting of a substantially hemispherical surface.

* * * * *